United States Patent
Dos Remedios et al.

(10) Patent No.: US 9,971,928 B2
(45) Date of Patent: May 15, 2018

(54) FINGERPRINT VERIFICATION SYSTEM

(71) Applicant: QUALCOMM Incorporated, San Diego, CA (US)

(72) Inventors: Alwyn Dos Remedios, Vaughan (CA); Frederick William Kiefer, Williamsville, NY (US); John Keith Schneider, Williamsville, NY (US); Tao Sheng, Richmond Hill (CA); Fitzgerald John Archibald, Toronto (CA); Ming Li, Amherst, NY (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 14/941,273

(22) Filed: Nov. 13, 2015

(65) Prior Publication Data

US 2016/0253548 A1    Sep. 1, 2016

Related U.S. Application Data

(60) Provisional application No. 62/126,127, filed on Feb. 27, 2015, provisional application No. 62/233,263, filed on Sep. 25, 2015.

(51) Int. Cl.
*G06K 9/00* (2006.01)
*G06K 9/62* (2006.01)

(52) U.S. Cl.
CPC ..... *G06K 9/00093* (2013.01); *G06K 9/00013* (2013.01); *G06K 9/00073* (2013.01); *G06K 9/00087* (2013.01); *G06K 9/6292* (2013.01)

(58) Field of Classification Search
CPC ............ G06K 9/00093; G06K 9/6292; G06K 9/00087; G06K 9/00013; G06K 9/00073

(Continued)

(56) References Cited

U.S. PATENT DOCUMENTS 5,572,597 A    11/1996   Chang et al.
5,909,501 A     6/1999   Thebaud
(Continued)

OTHER PUBLICATIONS

International Search Report and Written Opinion—PCT/US2015/060947—ISA/EPO—dated Feb. 3, 2016.

(Continued)

*Primary Examiner* — Amandeep Saini
(74) *Attorney, Agent, or Firm* — Silicon Valley Patent Group LLP

(57) ABSTRACT

Embodiments of apparatus, computer program product, and method for verifying fingerprint images are disclosed. In one embodiment, a method of verifying fingerprint images includes receiving an inquiry fingerprint image of a user, identifying pattern characteristics of the inquiry fingerprint image, identifying minutiae characteristics of the inquiry fingerprint image, determining a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints, and verifying the inquiry fingerprint image based on a set of fused scores computed using the weighted combination of the pattern characteristics of the inquiry fingerprint image and the minutiae characteristics of the inquiry fingerprint image.

27 Claims, 16 Drawing Sheets

(58) Field of Classification Search
USPC .................................................. 382/125
See application file for complete search history.

(56) References Cited

U.S. PATENT DOCUMENTS

| | | | |
|---|---|---|---|
| 6,640,008 B1 | 10/2003 | Lee et al. | |
| 7,142,699 B2 | 11/2006 | Reisman et al. | |
| 2007/0230754 A1 | 10/2007 | Jain et al. | |
| 2007/0248249 A1 | 10/2007 | Stoianov | |
| 2010/0002915 A1 | 1/2010 | Govan | |
| 2013/0263227 A1* | 10/2013 | Gongaware | H04L 63/08 726/4 |

OTHER PUBLICATIONS

Jain A.K., et al., "Filterbank-Based Fingerprint Matching", IEEE Transactions on Image Processing, XP055244833, May 2000, vol. 9, No. 5, pp. 846-859.

Maltoni D., et al., "Biometric Fusion", In: "Handbook of Fingerprint Recognition", Springer, XP055244857, 2009, Section 7, pp. 303-339.

Marcialis G.L., et al., "Fusion of Multiple Fingerprint Matchers by Single-Layer Perceptron with Class-Separation Loss Function", Pattern Recognition Letters, XP027779743, 2005, vol. 26, No. 12, pp. 1830-1839.

Quddus A., et al., "Fingerprint Pattern and Minutiae Fusion in Various Operational Scenarios" In: "Image Analysis and Recognition", Springer, XP055244828, 2011, vol. 6754, pp. 101-110.

Ulery B., et al., "Studies of Biometric Fusion", NISTIR 7346, National Institute of Standards and Technology (NIST), XP055244843, Jul. 20, 2006, pp. 1-22. Retrieved from the Internet: URL: http://www.nist.gov/manuscript-publication-search.cfm?pub_id=50872 [retrieved on 2016].

International Preliminary Report on Patentability—PCT/US2015/060947, the International Bureau of WIPO—Geneva, Switzerland, dated May 24, 2017.

Il-Seok Oh., et al., "Analysis of Class Separation and Combination of Class-Dependent Features for Handwriting Recognition," IEEE Transaction on Pattern Analysis and Machine Intelligence, vol. 21, No. 10, Oct. 1, 1999, pp. 1089-1094, XP055339905.

Prabhakar S., et al., "Decision-Level Fusion in Fingerprint Verification," Pattern Recognition Society, vol. 35, No. 4, Apr. 1, 2002, pp. 861-874, XP004329459.

Park U., et al., "Fingerprint Verification using SIFT Features," SPIE Defense and Security Symposium, 2008, 9 pages.

Ramli D.A., et al., "Performances of Weighted Sum-Rule Fusion Scheme in Multi-Instance and Multi-Modal Biometric Systems," World Applied Sciences, 2011, vol. 12 (11), pp. 2160-2167.

\* cited by examiner

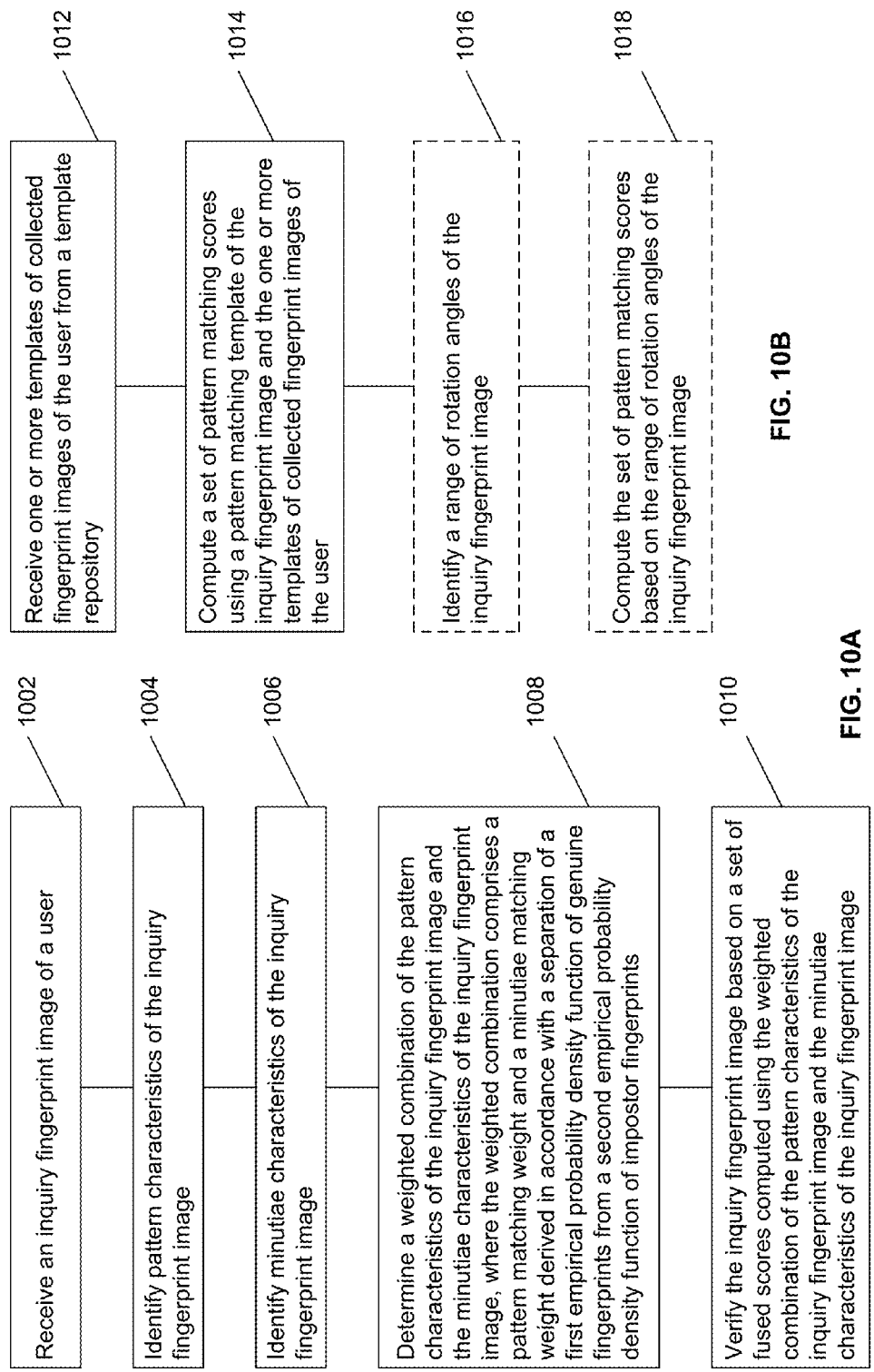

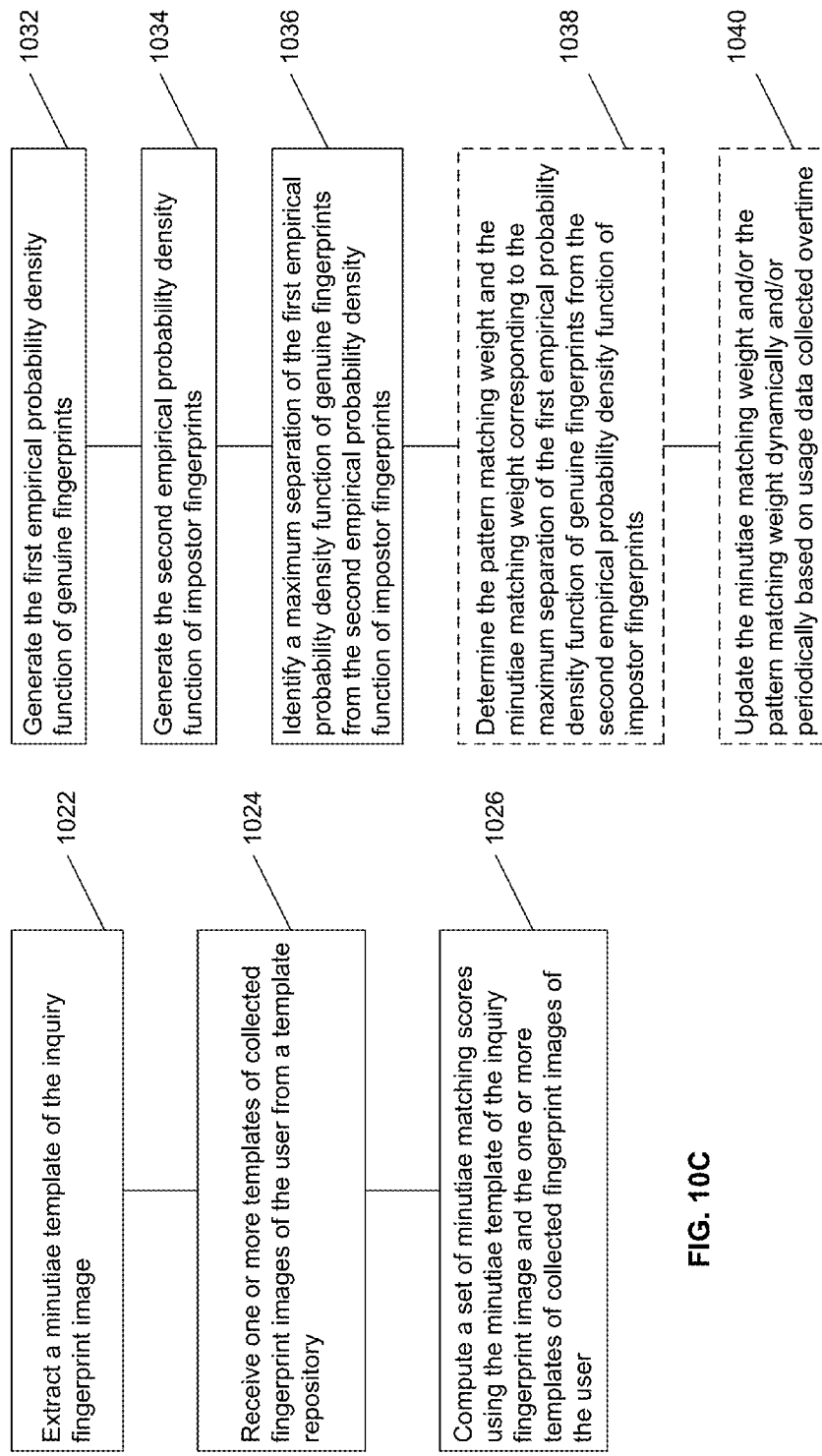

FINGERPRINT VERIFICATION SYSTEM

CROSS REFERENCE TO RELATED APPLICATIONS

This application claims the benefit of U.S. provisional application No. 62/126,127, "Fingerprint Verification System" filed Feb. 27, 2015; and U.S. provisional application No. 62/233,263, "Fingerprint Verification System" filed Sep. 25, 2015. The aforementioned United States applications are hereby incorporated by reference in their entirety.

FIELD

The present disclosure relates to the field of computer security. In particular, the present disclosure relates to apparatus, computer program product, and method for verifying fingerprint images.

BACKGROUND

Employing a fingerprint verification access system in place of a password or a pin to control a user's access to a device is known in the smartphone industry or in the computer industry. However, due to hardware space or cost limitations, the size of the fingerprint capturing window may be limited to 9 mm×4 mm or possibly smaller. These limitations may lead to higher false rejection rate or false acceptance rate in the enrollment and verification of a fingerprint of a user, which can adversely affect the user experience of the device. Thus, there is a need for an improved fingerprint verification system.

SUMMARY

Embodiments of apparatus, computer program product, and method for verifying fingerprint images are disclosed. In one embodiment, a method of verifying fingerprint images includes receiving an inquiry fingerprint image of a user, identifying pattern characteristics of the inquiry fingerprint image, identifying minutiae characteristics of the inquiry fingerprint image, determining a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints, and verifying the inquiry fingerprint image based on a set of fused scores computed using the weighted combination of the pattern characteristics of the inquiry fingerprint image and the minutiae characteristics of the inquiry fingerprint image.

In another embodiment, a mobile device configured to verify fingerprint images may include one or more sensors configured to receive an inquiry fingerprint image of a user, and one or more processors that include a control logic. The control logic may include logic configured to identify pattern characteristics of the inquiry fingerprint image, logic configured to identify minutiae characteristics of the inquiry fingerprint image, logic configured to determine a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints, and logic configured to verify the inquiry fingerprint image based on a set of fused scores computed using the weighted combination of the pattern characteristics of the inquiry fingerprint image and the minutiae characteristics of the inquiry fingerprint image.

In yet another embodiment, a non-transitory computer-readable storage medium including instructions stored thereon that, when executed, cause a mobile device to verify fingerprint images. The instructions may include instruction configured to receive an inquiry fingerprint image of a user, instruction configured to identify pattern characteristics of the inquiry fingerprint image, instruction configured to identify minutiae characteristics of the inquiry fingerprint image, instruction configured to determine a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints, and instruction configured to verify the inquiry fingerprint image based on a set of fused scores computed using the weighted combination of the pattern characteristics of the inquiry fingerprint image and the minutiae characteristics of the inquiry fingerprint image.

In yet another embodiment, an apparatus for verifying fingerprint images may include means for receiving an inquiry fingerprint image of a user, means for identifying pattern characteristics of the inquiry fingerprint image, means for identifying minutiae characteristics of the inquiry fingerprint image, means for determining a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints, and means for verifying the inquiry fingerprint image based on a set of fused scores computed using the weighted combination of the pattern characteristics of the inquiry fingerprint image and the minutiae characteristics of the inquiry fingerprint image.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

FIG. 10A illustrates an exemplary flow chart for implementing methods of verifying fingerprint images; FIG. 10B illustrates an exemplary flow chart for implementing methods of identifying pattern characteristics of an inquiry fingerprint image; FIG. 10C illustrates another exemplary flow chart for implementing methods of identifying minutiae characteristics of an inquiry fingerprint image; FIG. 10D illustrates another exemplary flow chart for implementing methods of determining a weighted combination of the pattern characteristics of the inquiry fingerprint image and the minutiae characteristics of the inquiry fingerprint image according to aspects of the present disclosure.

DESCRIPTION OF EMBODIMENTS

Embodiments of verifying fingerprint images are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1C:
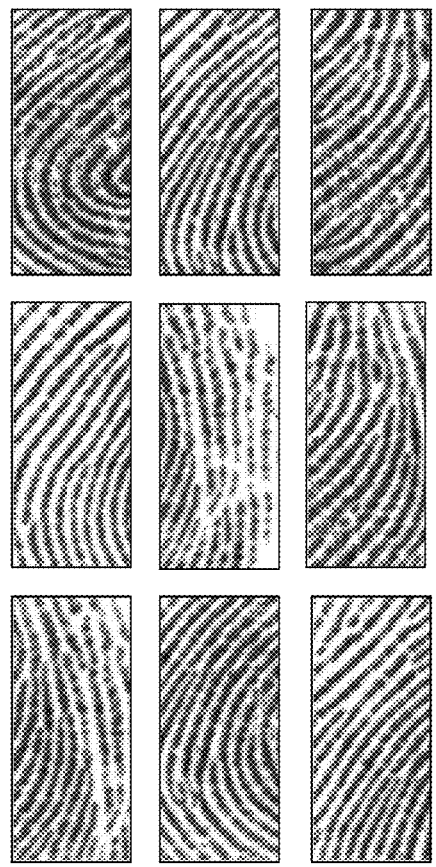
FIG. 1C illustrates sections of fingerprint images stored as templates in a template repository according to aspects of the present disclosure.
Figure 1A:
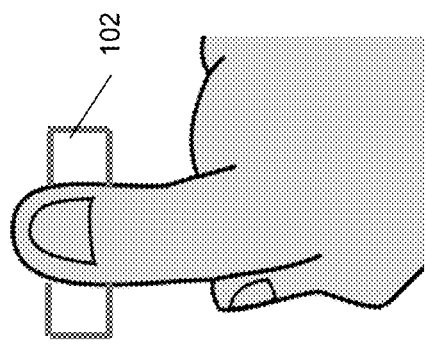
FIG. 1A illustrates an example of a fingerprint sensor in a mobile device.
Figure 1B:
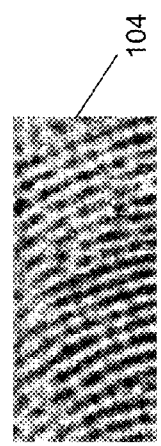
FIG. 1B illustrates an example of a portion of a fingerprint image captured by the fingerprint sensor of FIG. 1A.

FIG. 1A illustrates an example of a fingerprint sensor in a mobile device. In the example shown in FIG. 1A, a small image capture window 102 may be used to capture a portion of a user's fingerprint. In some implementations, the small image capture window 104 may have a dimension of 9 mm×4 mm (millimeters). In other implementations, the small image capture window 104 may have a dimension of 15 mm×6 mm. FIG. 1B illustrates an example of a portion of a fingerprint image 104 captured by the small image capture window 102 of FIG. 1A according to aspects of the present disclosure. As described in the following sections, the small image capture window 102 can introduce challenges in the enrollment as well as in the verification of the user's fingerprint images.

FIG. 1C illustrates sections of fingerprint images stored as templates in a template repository according to aspects of the present disclosure. As shown in FIG. 1C, a set of fingerprint images correspond to a plurality of fingerprint images of a user collected in a template repository. In some implementations, each image in the set of fingerprint images may represent a section of a single finger of the user. In some other implementations, the set of fingerprint images may represent sections of images collected from multiple fingers from the user.

Figure 2:
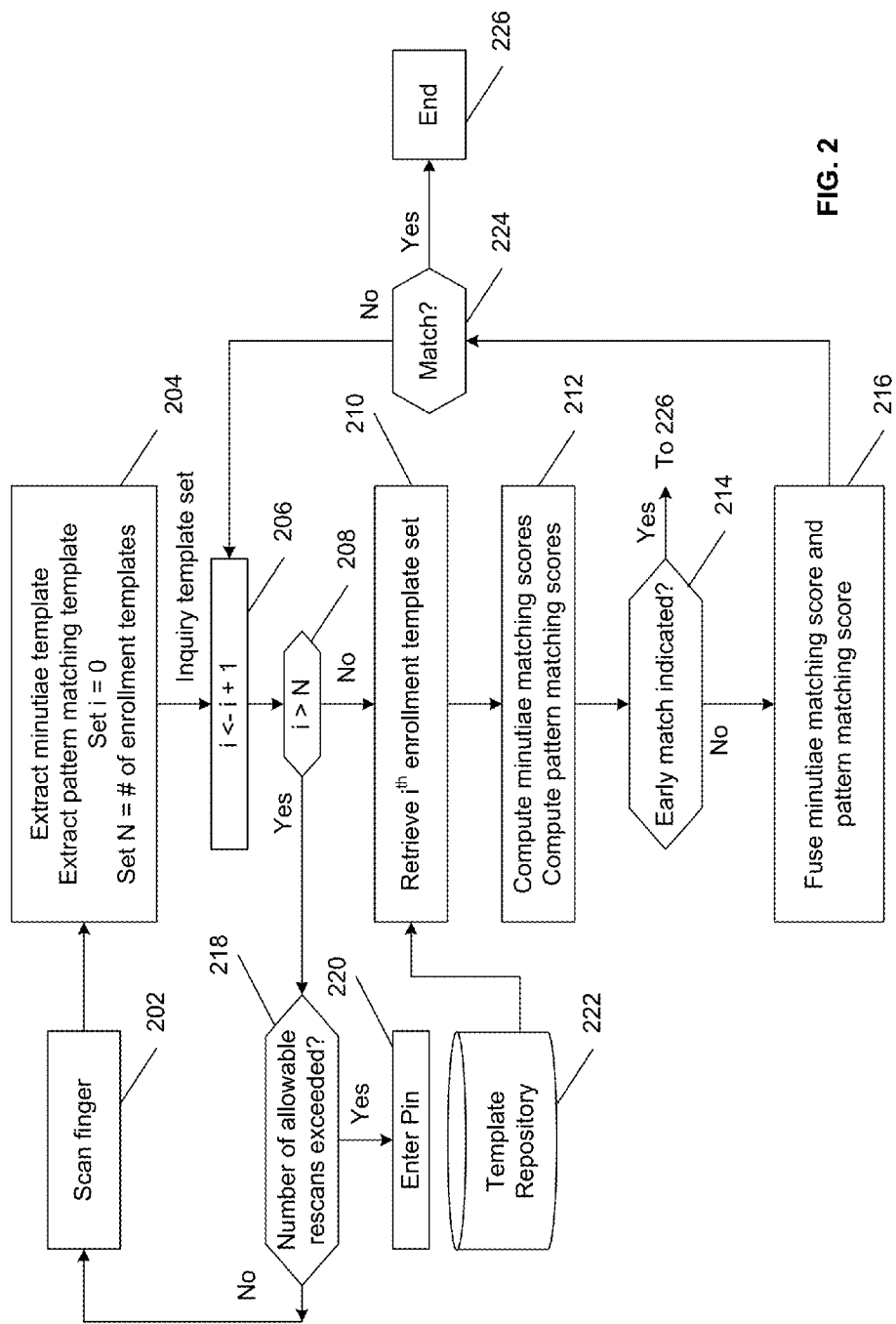
FIG. 2 illustrates an exemplary flow chart of a fingerprint verification process according to aspects of the present disclosure.

FIG. 2 illustrates an exemplary flow chart of a fingerprint verification process according to aspects of the present disclosure. As shown in FIG. 2, in block 202, the method scans a fingerprint of a user and captures the fingerprint image scanned. In block 204, the method extracts a minutia template and a pattern matching template from the fingerprint image captured. The method then sets a counter (i) to zero and sets the number of templates (N) determined from an enrollment process. In block 206, the method increments the counter (i) by one.

In block 208, the method determines whether the value of counter (i) is larger than the number of templates (N) stored in template repository 222. If the value of counter (i) is larger than the number of templates (208_Yes), the method moves to block 218. Alternatively, if the value of counter (i) is not larger than the number of templates (208_No), the method moves to block 210.

In block 210, the method retrieves the $i^{th}$ enrollment template set from the template repository 222. In block 212, the method computes one or more minutiae matching scores and computes one or more pattern matching scores for the fingerprint image captured. In block 214, the method determines whether an early match can be indicated from the one or more minutiae matching scores or from the one or more pattern matching scores. If an early match is indicated (214_Yes), the method moves to block 226. Otherwise, if there is not an early match (214_No), the method moves to block 216. In block 216, the method fuses the one or more minutiae matching scores and the one or more pattern matching scores.

In block 218, the method determines whether the number of allowable rescans has been exceeded. If the number of allowable rescans has been exceeded (218_Yes), the method moves to block 220. On the other hand, if the number of allowable rescans has not been exceeded (218_No), the method moves to block 202, and the fingerprint is rescanned. According to aspects of the present disclosure, the user may be directed to rotate and/or translate the finger in the rescan in order to get a better fingerprint image. In block 220, the method prompts the user to enter a pin number to complete the user authentication process.

In block 224, the method determines whether there is a match of the fingerprint image captured based on a fused score of the minutiae matching scores and the pattern matching scores. If there is not a match (224_No), the method moves to block 206. Alternatively, if there is a match (224_Yes), the method moves to block 226 and the fingerprint image verification is ended.

Figure 3:
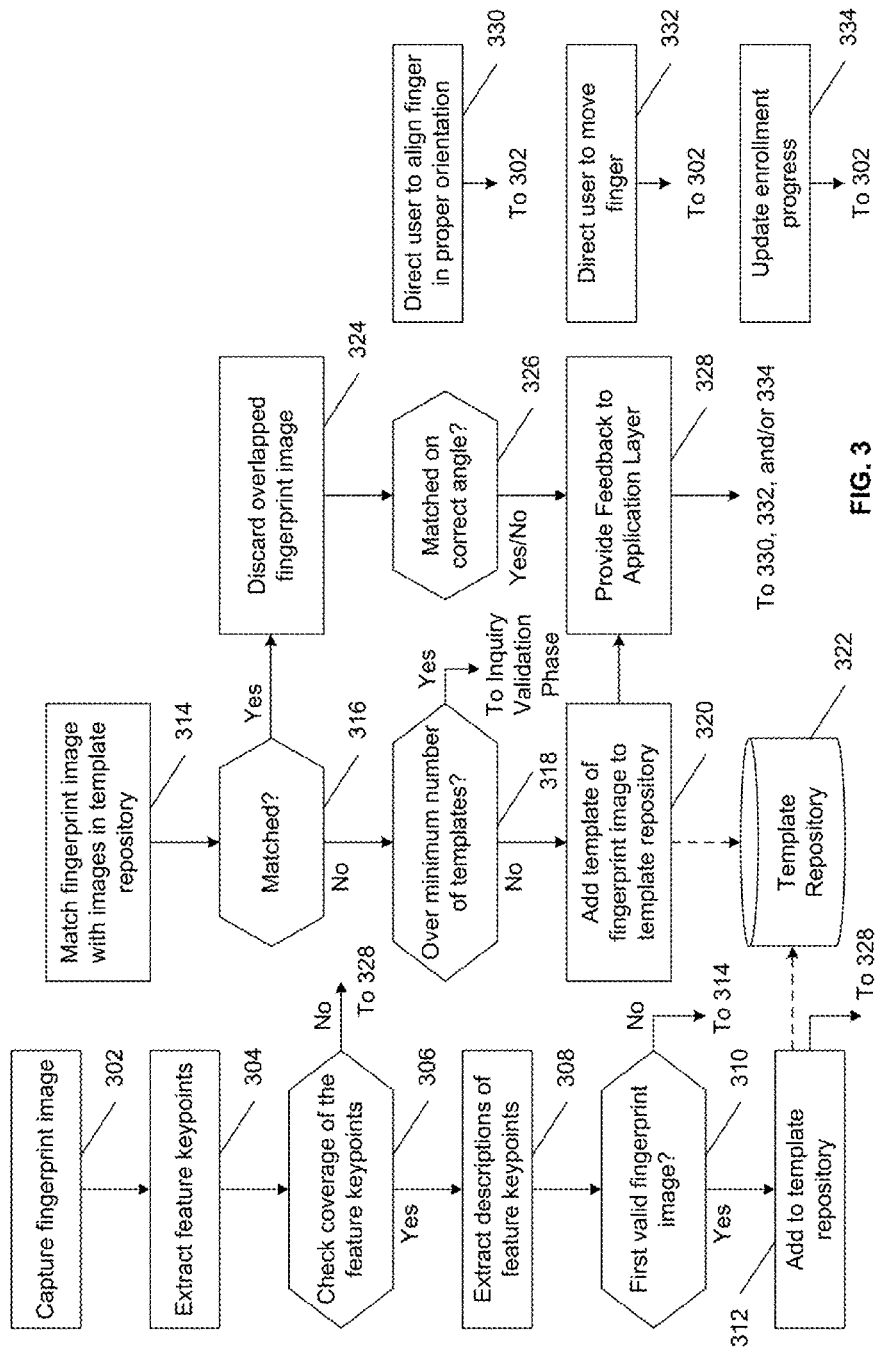
FIG. 3 illustrates an exemplary implementation of enrollment of a user's fingerprint images according to aspects of the present disclosure.

FIG. 3 illustrates an exemplary implementation of enrollment of a user's fingerprint images according to aspects of the present disclosure. As shown in FIG. 3, in block 302, the method captures a fingerprint image. In block 304, the method extracts feature keypoints from the fingerprint image captured. In block 306, the method checks the coverage and distributions of the feature keypoints with respect to the fingerprint image captured. If there is sufficient coverage of the fingerprint image by the feature keypoints (306_Yes), the method moves to block 308. Alternatively, if there is insufficient coverage of the fingerprint image by the feature keypoints (306_No), the method moves to block 328. In block 308, the method extracts descriptions of the feature keypoints of the fingerprint image.

In block 310, the method determines whether the fingerprint image captured is a first valid fingerprint image. If the fingerprint image captured is a first valid fingerprint image (310_Yes), the method moves to block 312. On the other hand, if the fingerprint image captured is not a first valid fingerprint image (310_No), the method moves to block 314. In block 312, the method adds the template of the fingerprint image to a template repository 322, and then moves to block 328.

In block 314, the method attempts to match the template of fingerprint image captured with one or more templates of images in the template repository 322; it then moves to block 316. In block 316, the method determines whether there is a match between the template of fingerprint image captured and the templates of one or more images in the template repository 322. If there is a match (316_Yes), the method moves to block 324. Otherwise, if there is not a match (316_No), the method moves to block 318.

In block 318, the method determines whether the number of templates (descriptions of the fingerprint images) associated with a user's fingerprint in the template repository 322 exceeds a minimum number of templates. In some implementations, a template may include at least one of: 1) descriptions of feature keypoints; 2) minutiae template; 3) pattern matching template; or any combination thereof. If the number of templates exceeds a minimum number of templates (318_Yes), the method exits the enrollment phase (also referred to as the template repository collection phase) and moves to a fingerprint inquiry validation phase, which is described below in association with FIG. 4. Alternatively, if the number of templates does not exceed a minimum number of templates (318_No), the method moves to block 320. In block 320, the method adds the template of the fingerprint image to the template repository 322, and then moves to block 328.

In block 324, the method discards the overlapped (matched) fingerprint image. In block 326, the method determines whether the overlapped fingerprint image is matched on correct angle. Whether the overlapped fingerprint image is matched on correct angle or not, in both situations the method moves to block 328, but different feedback messages and/or instructions may be provided to the user depending on the outcome of whether the overlapped fingerprint image is matched on the correct angle.

In block 328, the method provides feedback to the application layer, and then it may move to one or more of the blocks 330, 332, and/or 334. In block 330, the application layer may direct the user to align finger in proper orientation in the event of the overlapped fingerprint image is not matched on correct angle. Then, the method may move back to block 302. In block 332, the application layer may direct the user to move the finger in the event of the overlapped fingerprint image is matched on correct angle. In addition, the application layer may direct the user to move the finger to get a better coverage of the sensor area as in the case when there is insufficient coverage of the fingerprint image by the feature keypoints as determined in block 306. After block 332, the method moves back to block 302. In block 334, the application layer may provide an update of the enrollment progress to the user. For example, if a template of a fingerprint image is successfully added to the template repository 322, a forward progress may be shown to the user. On the other hand, if the method cannot use the fingerprint image captured, for example due to insufficient coverage by the feature keypoints, then the progress bar (not shown) may not advance or a negative progress may be shown to the user. After block 334, the method moves back to block 302.

Figure 4:
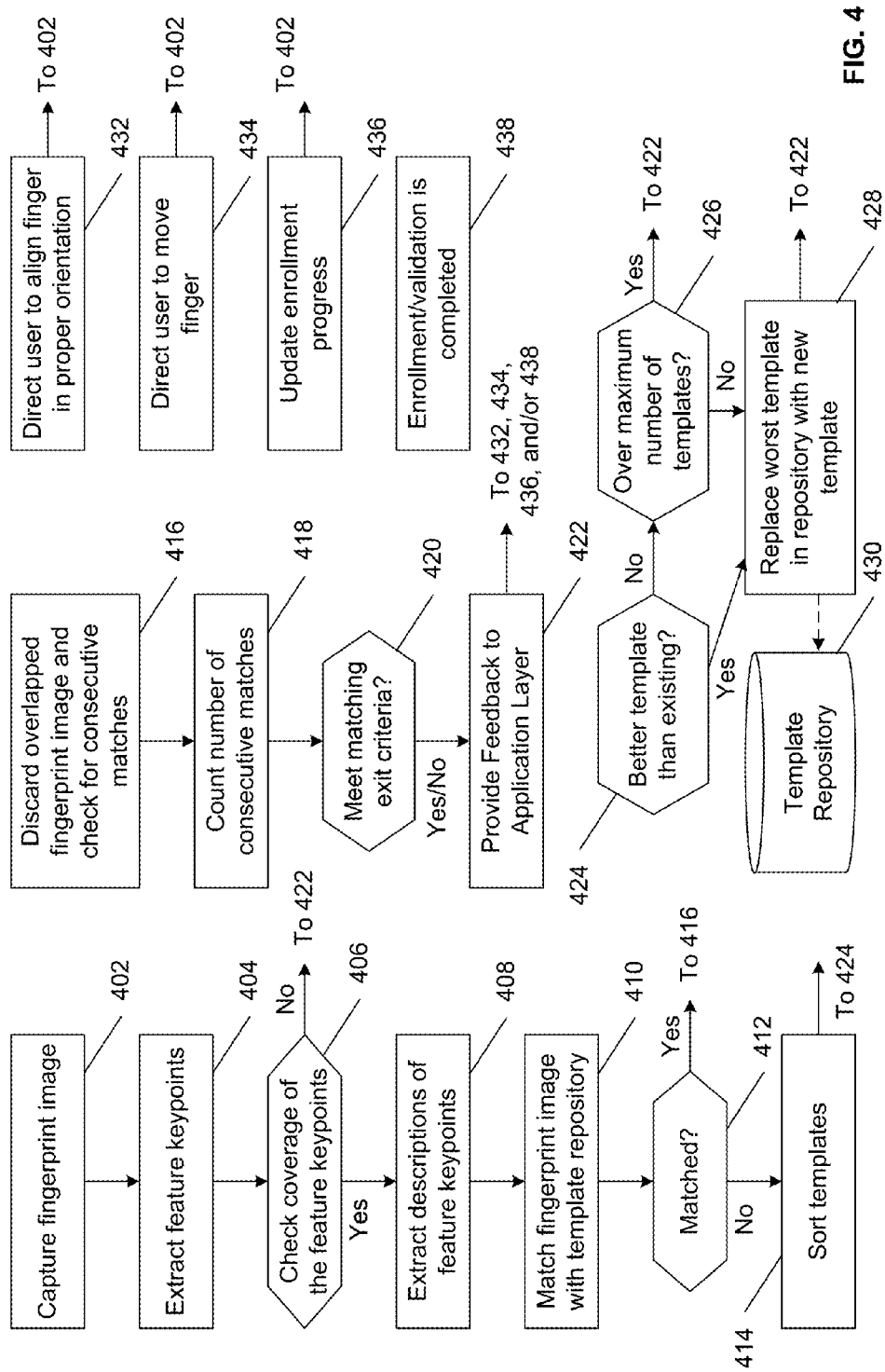
FIG. 4 illustrates an exemplary implementation of validation of a user's fingerprint image(s) according to aspects of the present disclosure.

FIG. 4 illustrates an exemplary implementation of validation of a user's fingerprint image(s) according to aspects of the present disclosure. In the exemplary implementation shown in FIG. 4, in block 402, the method captures a fingerprint image. In block 404, the method extracts feature keypoints from the fingerprint image captured. In block 406, the method checks the coverage and distributions of the feature keypoints with respect to the fingerprint image captured. If there is sufficient coverage of the fingerprint image by the feature keypoints (406_Yes), the method moves to block 408. Alternatively, if there is insufficient coverage of the fingerprint image by the feature keypoints (406_No), the method moves to block 422. In block 408, the method extracts descriptions of the feature keypoints of the fingerprint image.

In block 410, the method attempts to match the template of fingerprint image captured with one or more templates of images in a template repository 430; it then moves to block 412. In block 412, the method determines whether there is a match between the template of fingerprint image captured and the one or more templates of images in the template repository 430. If there is a match (412_Yes), the method moves to block 416. Otherwise, if there is not a match (412_No), the method moves to block 414.

In block 416, the method discards the overlapped (matched) fingerprint image, and checks for consecutive matches. In block 418, the method counts the number of consecutive matches (for example 5 consecutive matches). Note that in some implementations, instead of checking for consecutive matches, the method may check for a percentage of matches in block 416 and may count the percentage of matches (such as 80% of matches) among a plurality of checks in block 418.

In block 420, the method determines whether the matching exit criteria have been met. Whether the matching exit criteria have been met or not, in both situations the method moves to block 422, but different feedback messages and/or instructions may be provided to the user depending on the outcome of whether the matching exit criteria have been met.

In block 414, the method sorts the templates in the template repository 430. In block 424, the method determines whether the fingerprint image is a better template than the existing templates of images in the template repository 430. If the fingerprint image is a better template than at least one of the existing templates of images in the template repository 430 (424_Yes), the method moves to block 428. Alternatively, if the fingerprint image is not a better template than at least one of the existing templates of images in the template repository 430 (424_No), the method moves to block 426.

In block 426, the method determines whether the number of templates associated with a user's finger in the template repository has exceeded a maximum number of templates. If the number of templates has exceeded a maximum number of templates (426_Yes), the method moves to block 422. On the other hand, if the number of templates has not exceeded a maximum number of templates (426_No), the method moves to block 428. In block 428, the method replaces the worst template in the template repository 430 with the template of the fingerprint image, which is considered as a new template. The method then moves to block 422.

In block 422, the method provides feedback to the application layer, and then it may move to one or more of the blocks 432, 434, 436, and/or 438. In block 432, the application layer may direct the user to align finger in proper orientation. Then, the method may move back to block 402. In block 434, the application layer may direct the user to move the finger to get a better coverage of the sensor area as in the case when there is insufficient coverage of the fingerprint image by the feature keypoints as determined in block 406. After block 434, the method moves back to block 402. In block 436, the application layer may provide an update of the enrollment and/or validation progress to the user. For example, if the number of consecutive matches or the percent of matches meets the matching exit criteria, a forward progress may be shown to the user. On the other hand, if the method cannot use the fingerprint image captured, for example due to insufficient coverage by the feature keypoints or due to the maximum number of templates in the template repository has been exceeded, then the progress bar (not shown) may not advance or a negative progress may be shown to the user. After block 436, the method moves back to block 402. In block 438, the user may be notified that the enrollment and/or validation have been completed.

Figure 5:
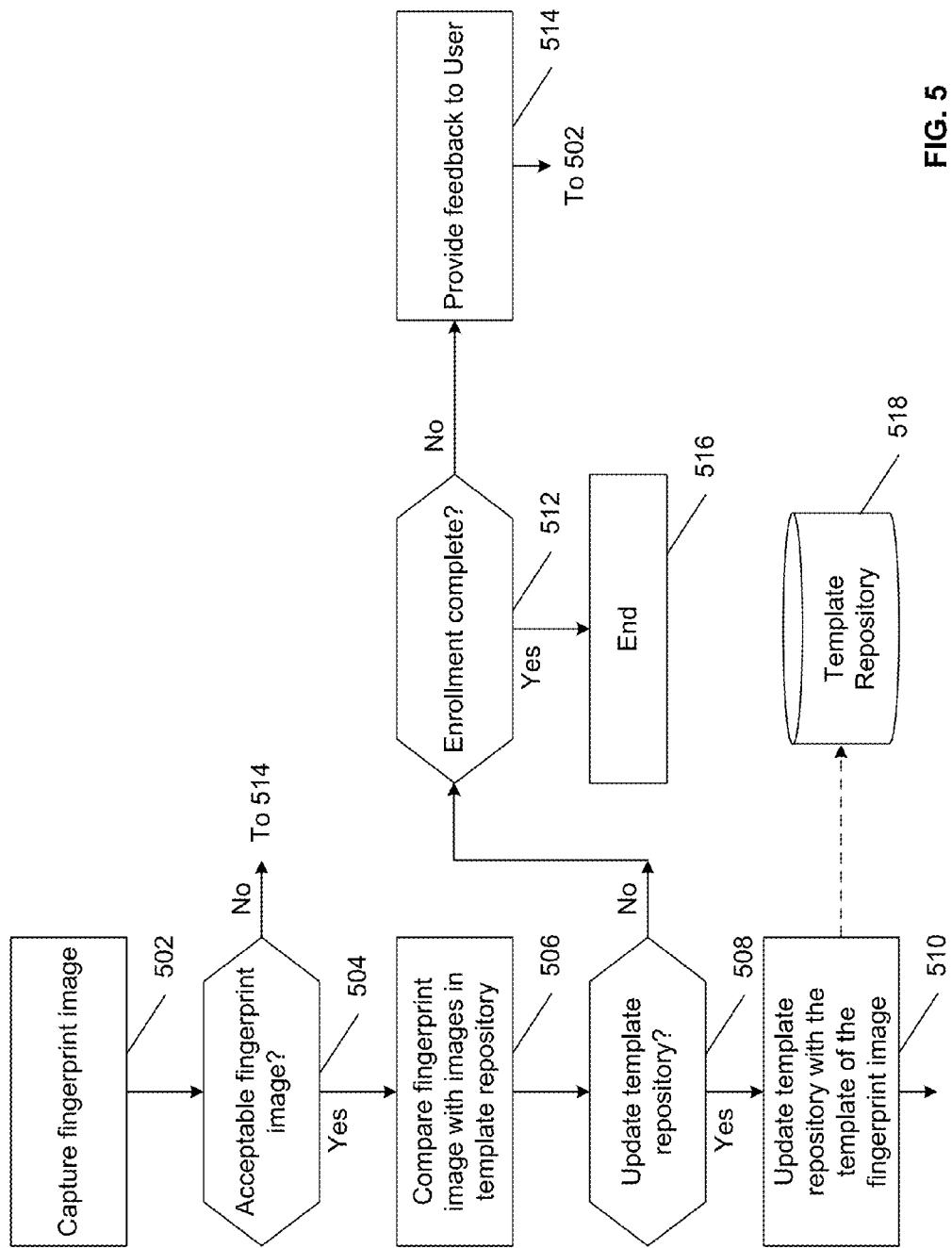
FIG. 5 illustrates another implementation of enrollment of a user's fingerprint images according to aspects of the present disclosure.

FIG. 5 illustrates another implementation of enrollment of a user's fingerprint images according to aspects of the present disclosure. In the example shown in FIG. 5, in block 502, the method captures a fingerprint image. In block 504, the method determines whether the fingerprint image captured is acceptable. In some implementations, the methods performed in blocks 304 and 306 of FIG. 3 may be performed in block 504. If the fingerprint image captured is acceptable (504_Yes), the method moves to block 506. Otherwise, if the fingerprint image captured is not acceptable (504_No), the method moves to block 514.

In block 506, the method compares the template of the fingerprint image with one or more templates of the images stored in the template repository 518. In some implementations, the methods performed in blocks 308 and 314 of FIG. 3 may be performed in block 506. In block 508, the method determines whether to update the template repository 518 with the template of the fingerprint image. In some implementations, the methods performed in blocks 310, 316, and 318 of FIG. 3 may be performed in block 508. If it is determined to update the template repository 518 with the template of the fingerprint image (508_Yes), the method moves to block 510. Alternatively, if it is determined not to update the template repository 518 with the template of the fingerprint image (508_No), the method moves to block 512.

In block 510, the method updates the template repository 518 with the template of the fingerprint image. In some implementations, the methods performed in blocks 312 and 320 of FIG. 3 may be performed in block 510. In block 512, the method determines whether the enrollment (also referred to as the template repository collection phase) has been completed. In some implementations, the method performed in block 318 of FIG. 3 may be performed in block 512. If the enrollment has been completed (512_Yes), the method ends in block 516. Otherwise, if the enrollment has not been completed (512_No), the method moves to block 514.

In block 514, the method provides feedback about the status of the enrollment progress to the user, and then moves to block 502. In some implementations, the methods performed in blocks 328, 330, 332, and/or 334 of FIG. 3 may be performed in block 514. For example, the method may provide feedback to the user through an application layer. The application layer may direct the user to align finger in proper orientation in the event of the overlapped fingerprint image is not matched on correct angle. In addition, the application layer may direct the user to move the finger in the event of an overlapped fingerprint image is matched on correct angle. The application layer may also direct the user to move the finger to get a better coverage of the sensor area as in the case when the fingerprint image is not acceptable as determined in block 504. Moreover, the application layer may provide an update of the enrollment progress to the user. After a fingerprint image has been successfully added to the template repository 518, a forward progress may be shown to the user. On the other hand, if the fingerprint image is not acceptable as determined in block 504, for example due to insufficient coverage by the feature keypoints, then the progress bar (not shown) may not advance or a negative progress may be shown to the user.

Figure 6:
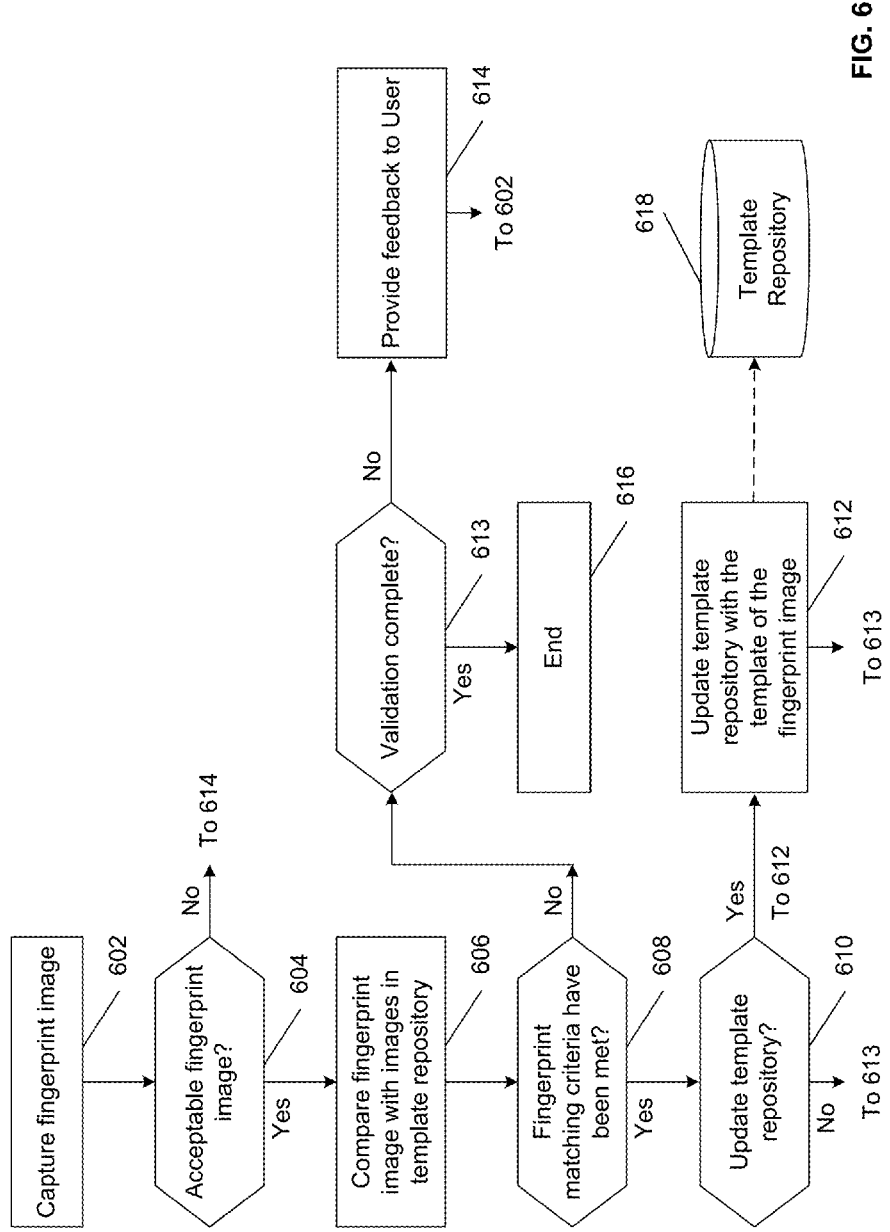
FIG. 6 illustrates another implementation of validation of a user's fingerprint image(s) according to aspects of the present disclosure.

FIG. 6 illustrates another implementation of validation of a user's fingerprint image(s) according to aspects of the present disclosure. As shown in FIG. 6, in block 602, the method captures a fingerprint image. In block 604, the method determines whether the fingerprint image captured is acceptable. In some implementations, the methods performed in blocks 404 and 406 of FIG. 4 may be performed in block 604. If the fingerprint image captured is acceptable (604_Yes), the method moves to block 606. Otherwise, if the fingerprint image captured is not acceptable (604_No), the method moves to block 614. In block 606, the method compares the template of the fingerprint image with the templates of the one or more images stored in the template repository 618. In some implementations, the methods performed in blocks 408 and 410 of FIG. 4 may be performed in block 606.

In block 608, the method determines whether the fingerprint matching criteria have been met. In some implementations, the methods performed in block 412 of FIG. 4 may be performed in block 608. If the fingerprint matching criteria have been met (608_Yes), the method moves to block 610. On the other hand, if the fingerprint matching criteria have not been met (608_No), the method moves to block 613.

In block 610, the method determines whether to update the template repository 618 with the fingerprint image. In some implementations, the methods performed in blocks 414, 424, and 426 of FIG. 4 may be performed in block 610. If it is determined to update the template repository 618 with the template of the fingerprint image (610_Yes), the method moves to block 612. Alternatively, if it is determined not to update the template repository 618 with the template of the fingerprint image (610_No), the method moves to block 613. In block 612, the method updates the template repository 618 with the template of the fingerprint image, and then moves to block 613. In some implementations, the method performed in block 428 of FIG. 4 may be performed in block 612.

In block 613, the method determines whether the fingerprint inquiry validation phase has been completed. In some implementations, the method performed in blocks 416, 418, and 420 of FIG. 4 may be performed in block 613. If it is determined that the fingerprint inquiry validation phase has been completed (613_Yes), the method ends in block 616. Otherwise, if it is determined that the fingerprint inquiry validation phase has not been completed (613_No), the method moves to block 614.

In block 614, the method provides feedback about the status of the enrollment and/or validation progress to the user, and then moves to block 602. In some implementations, the methods performed in blocks 422, 432, 434, and/or 436 of FIG. 4 may be performed in block 614. For example, the method may provide feedback to the user through an application layer. The application layer may direct the user to align finger in proper orientation. In addition, the application layer may direct the user to move the finger. The application layer may also direct the user to move the finger to get a better coverage of the sensor area as in the case when the fingerprint image is not acceptable as determined in block 604. Moreover, the application layer may provide an update of the enrollment and/or validation progress to the user. After a number of successful matches have been identified, a forward progress or an enrollment/validation completion message may be shown to the user. On the other hand, if the fingerprint image is not acceptable as determined in block 604, for example due to insufficient coverage by the feature keypoints, then the progress bar (not shown) may not advance or a negative progress may be shown to the user.

In some implementations, a set of templates that correspond to the set of fingerprint images are stored in the template repository. According to aspect of the present disclosure, a template may include at least one of: 1) descriptions of feature keypoints; 2) minutiae template; 3) pattern matching template; or any combination thereof. For example, a set of fingerprint images correspond to a plurality of fingerprint images of a user collected in the template repository. In some implementations, each image in the set of fingerprint images may represent a section of a single finger of the user. In some other implementations, the set of fingerprint images may represent sections of images collected from multiple fingers from the user. Note that rejected fingerprint images or the templates of the rejected fingerprint images may not be added to the template repository. For example, a fingerprint image may be rejected due to insufficient number of feature keypoints in this fingerprint image. A fingerprint image may also be rejected because it may be a sufficiently overlapped image with respect to the set of fingerprint images of the user in the template repository.

Figure 7:
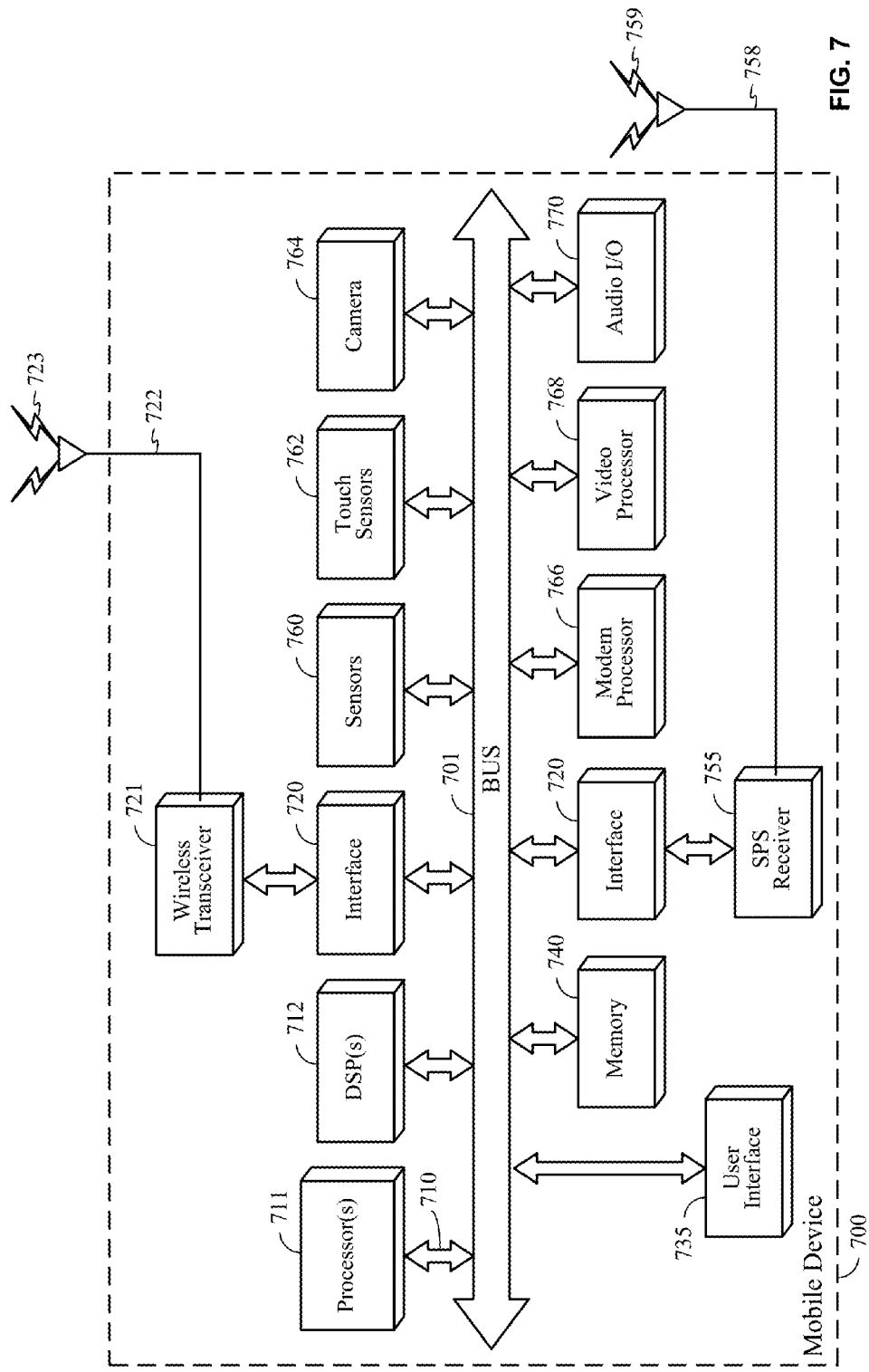
FIG. 7 illustrates an exemplary block diagram of a device that can be configured to implement methods of verifying fingerprint images according to aspects of the present disclosure.

FIG. 7 illustrates an exemplary block diagram of a device that can be configured to implement methods of verifying fingerprint images according to aspects of the present disclosure. A device may comprise one or more features of mobile device 700 shown in FIG. 7. In certain embodiments, mobile device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also comprise SPS receiver 755 capable of receiving and acquiring SPS signals 759 via SPS antenna 758. SPS receiver 755 may also process, in whole or in part, acquired SPS signals 759 for estimating a location of a mobile device. In some embodiments, processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless STA as discussed above. Processor(s) 711 and/or DSP(s) 712 may execute instructions to execute one or more aspects of processes/methods discussed below in connection with FIG. 8. Processor(s) 711 and/or DSP(s) 712 may perform the methods and/or functions as described in FIG. 1A-1C, FIG. 2-6, and FIG. 8A-8B through FIG. 10A-10D.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DSP(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8A:
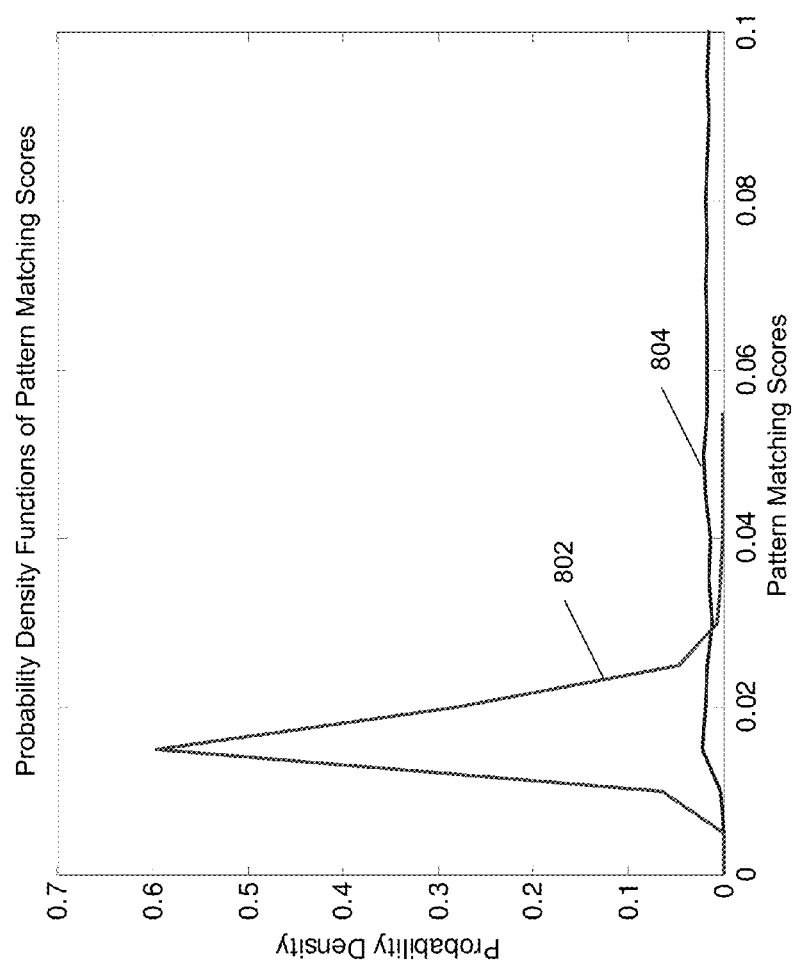
FIG. 8A illustrates exemplary pattern matching score probability density functions of genuine fingerprint images and impostor fingerprint images.

FIG. 8A illustrates exemplary pattern matching score probability density functions of genuine fingerprint images and impostor fingerprint images according to aspects of the present disclosure. As shown in FIG. 8A, the vertical axis represents the probability density of pattern matching scores and the horizontal axis represents the pattern matching scores. Curve 802 is an example of probability density function for empirical pattern matching scores of impostor fingerprint images. Curve 804 is an example of probability density function for empirical pattern matching scores of genuine fingerprint images. In this example, there is virtually no impostor pattern matching scores exceed the value of 0.08. In view of the characteristics of the probability density function for empirical pattern matching scores of impostor fingerprint images, as described above in association with the verification process of FIG. 2, if a pattern matching score exceeds 0.08, it can be determined that the condition of an early match is met, and an access to the mobile device may be granted without any further processing.

Figure 8B:
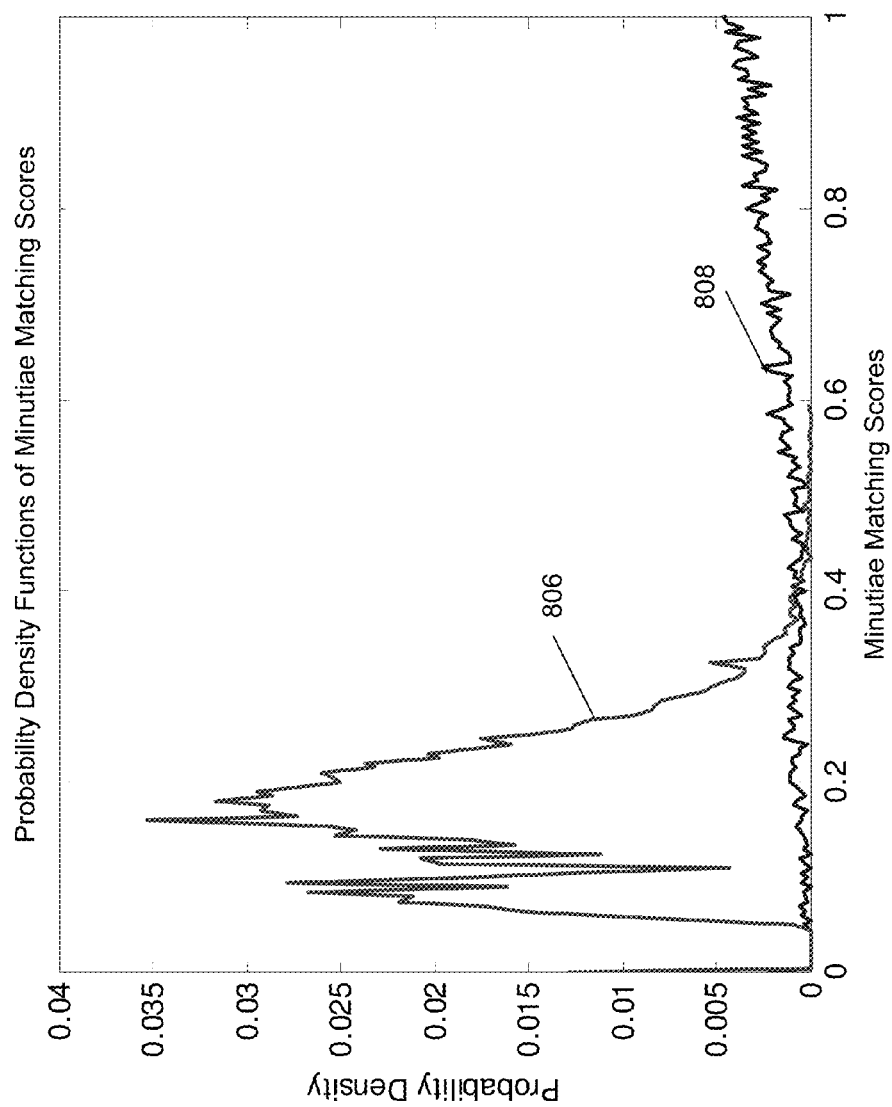
FIG. 8B illustrates exemplary minutiae matching score probability density functions of genuine fingerprint images and impostor fingerprint images according to aspects of the present disclosure.

FIG. 8B illustrates exemplary minutiae matching score probability density functions of genuine fingerprint images and impostor fingerprint images according to aspects of the present disclosure. In the example shown in FIG. 8B, the vertical axis represents the probability density of minutiae matching scores and the horizontal axis represents the minutiae matching scores. Curve 806 is an example of probability density function for empirical minutiae matching scores of impostor fingerprint images. Curve 808 is an example of probability density function for empirical minutiae matching scores of genuine fingerprint images. In this example, there is virtually no impostor minutiae matching scores exceed the value of 0.6. In view of the characteristics of the probability density function for empirical minutiae matching scores of impostor fingerprint images, as described above in association with the verification process of FIG. 2, if a minutia matching score exceeds 0.6, it can be determined that the condition of an early match is met, and an access to the mobile device may be granted without any further processing.

Referring to back to FIG. 2, in block 216, the method fuses minutiae matching scores and pattern matching scores. In some implementations, the minutiae matching scores and the pattern matching scores may be normalized and transformed to the [0,1] interval using the following expression.

$$s = \frac{s_i - \min_{i=1}^{N}(s_i)}{\max_{i=1}^{N}(s_i) - \min_{i=1}^{N}(s_i)}$$

Given a minutia matching score $S_m$ and a pattern matching score $S_p$, the fused score can be computed by: $S_f = w_m S_m + w_p S_p$, where the weights $w_m$ and $w_p$ can be determined empirically. One approach is to minimize the area under the probability density function curves of minutiae matching scores and pattern matching scores of genuine fingerprint images as well as imposter fingerprint images. The optimal weights for $w_m$ and $w_p$ would give the minimum area under the probability density curves as mentioned above. For example, in one embodiment, the method may employ the following steps to find the minimum area under the probability density curves:

For $w_m$=0 to 1 in increments of 0.001
    Set $w_p = 1 - w_m$
    Build distribution of weighted genuine and impostor sums
    Let $f_g$ be the empirical probability density function for the genuine fused scores
    Let $f_i$ be the empirical probability density function for the impostor fused scores
    Compute Area=$\int \min(f_g, f_i) dx$
End for In some implementations, the above process may be performed once to determine the weights of $w_m$ and $w_p$, and the process may be performed offline. In some other implementations, the weights $w_m$ and $w_p$ may be adjusted periodically and/or dynamically based on usage data collected over time.

Figure 9A:
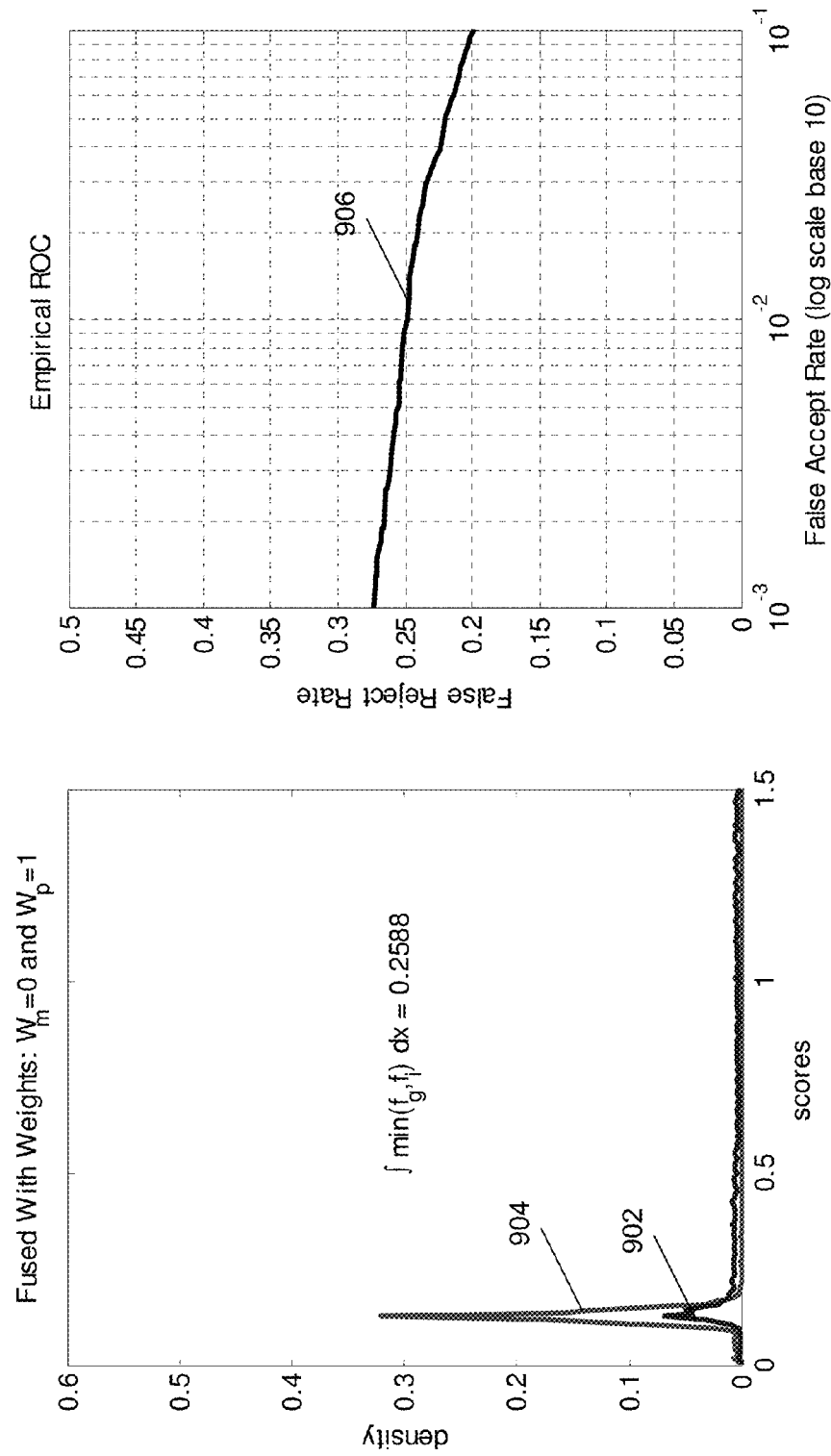
FIG. 9A illustrates an example of applying a set of weights to fuse minutiae matching scores and pattern matching scores.

FIG. 9A illustrates an example of applying a set of weights to fuse minutiae matching scores and pattern matching scores. In this example, the set of weights being used is $w_m=0$ and $w_p=1$, which represents the initial step of the fusion process of the minutiae matching scores and pattern matching scores described above. The plot on the left-hand side shows substantial overlap between the fused scores for the genuine fingerprint images (curve 902) and the fused scores for the impostor fingerprint images (curve 904). The plot on the right-hand side shows a corresponding empirical receiver operating characteristics (ROC) 906 for the set of weights of $w_m=0$ and $w_p=1$. For example, for the set of weights of $w_m=0$ and $w_p=1$, for a false accept rate of approximately 1%, the associated false reject rate would be approximately 25%.

Figure 9B:
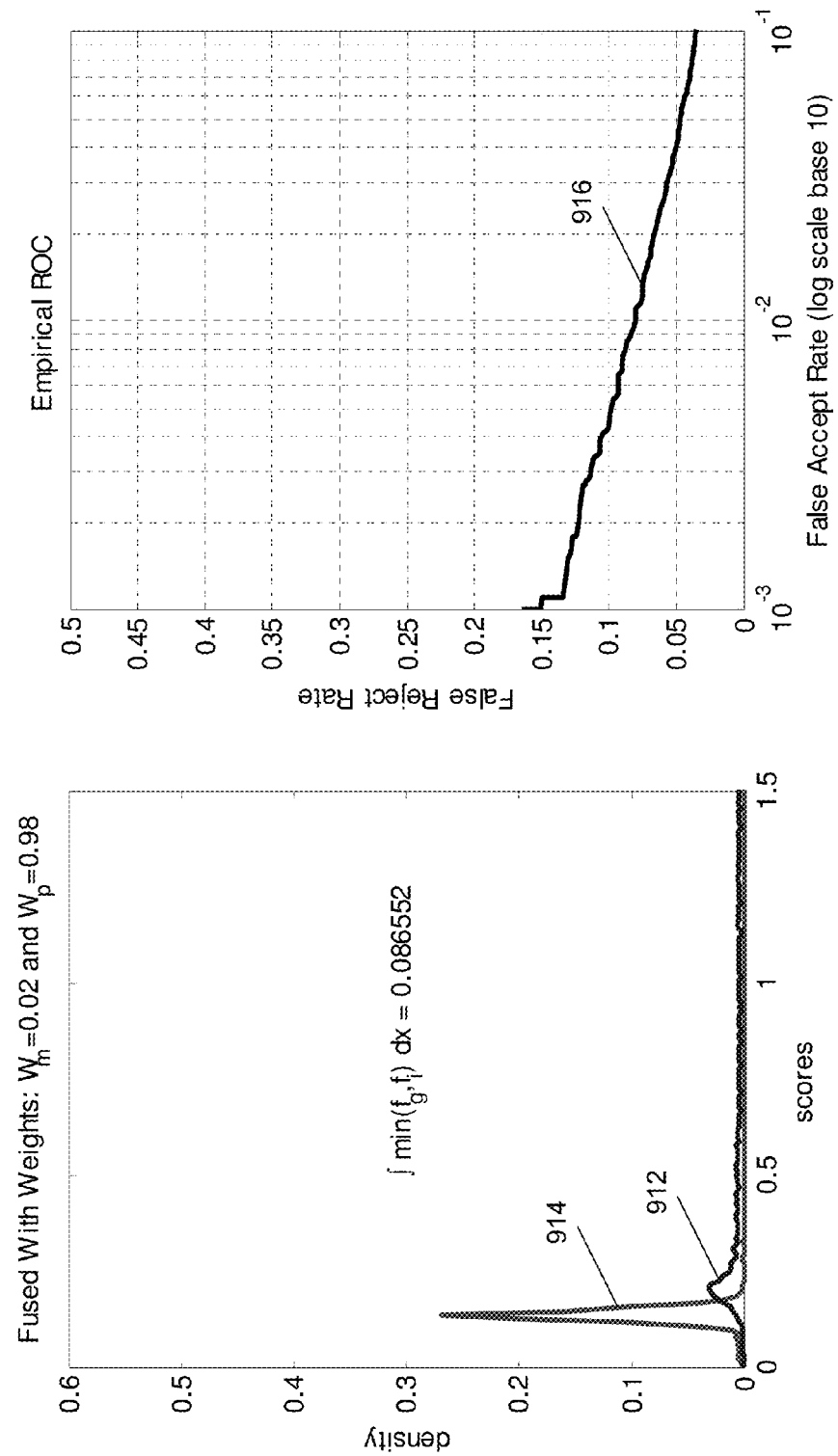
FIG. 9B illustrates an example of applying another set of weights to fuse minutiae matching scores and pattern matching scores.

FIG. 9B illustrates an example of applying another set of weights to fuse minutiae matching scores and pattern matching scores. In this example, the set of weights being used is $w_m=0.02$ and $w_p=0.98$, which represents another step of the fusion process of the minutiae matching scores and pattern matching scores described above. The plot on the left-hand side shows some in separation between the fused scores for the genuine fingerprint images (curve 912) and the fused scores for the impostor fingerprint images (curve 914). The plot on the right-hand side shows a corresponding empirical ROC 916 for the set of weights of $w_m=0.02$ and $w_p=0.98$.

For example, for the set of weights of $w_m=0.02$ and $w_p=0.98$, for a false accept rate of approximately 1%, the associated false reject rate would be approximately 8%, which shows some improvements over the set of weights of $w_m=0$ and $w_p=1$.

Figure 9C:
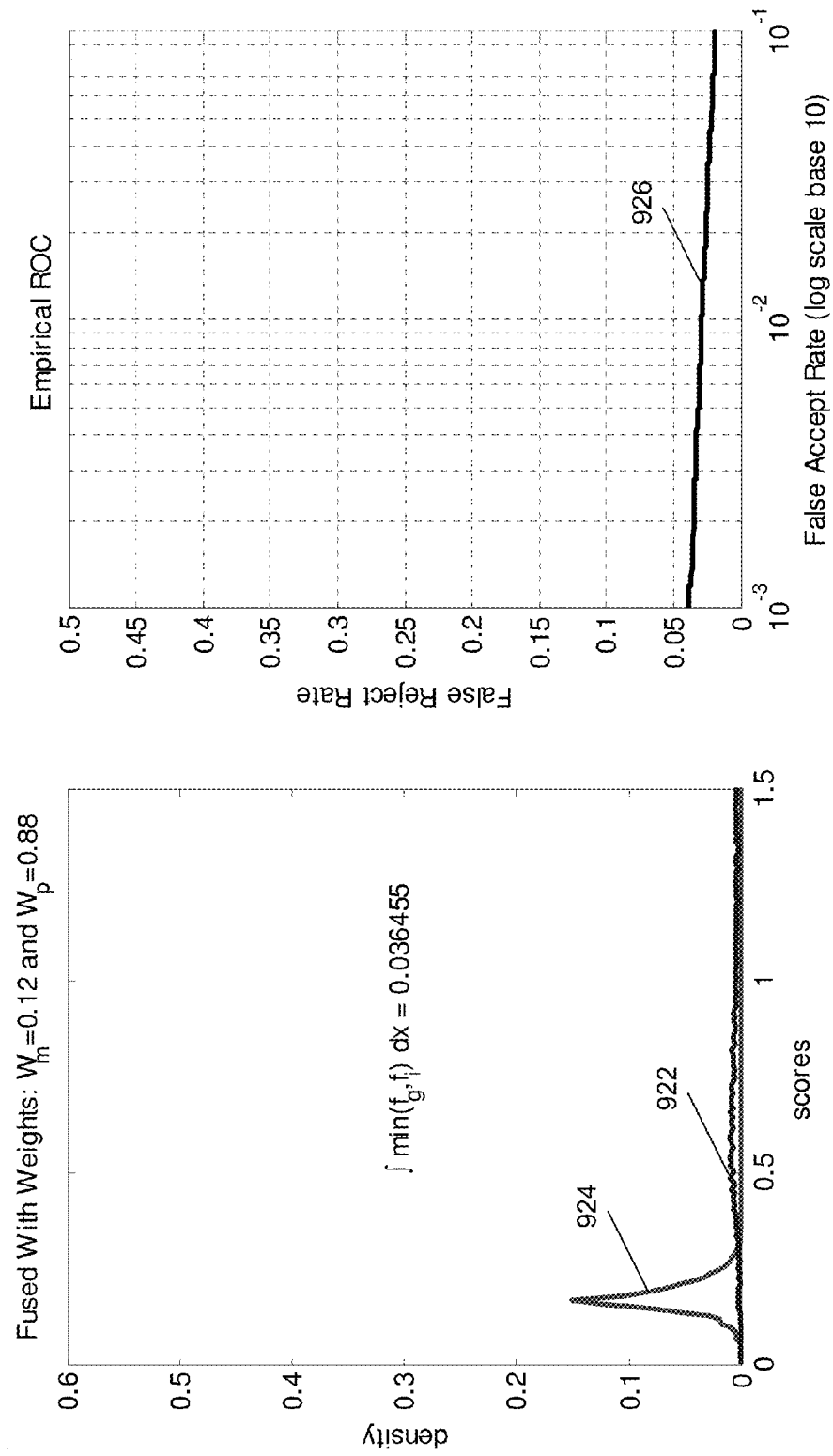
FIG. 9C illustrates an example of applying yet another set of weights to fuse minutiae matching scores and pattern matching scores.

FIG. 9C illustrates an example of applying yet another set of weights to fuse minutiae matching scores and pattern matching scores. In this example, the set of weights being used is $w_m=0.12$ and $w_p=0.88$, which represents yet another step of the fusion process of the minutiae matching scores and pattern matching scores described above. The plot on the left-hand side shows a substantial improvement in separation between the fused scores for the genuine fingerprint images (curve 922) and the fused scores for the impostor fingerprint images (curve 924). The plot on the right-hand side shows a corresponding empirical ROC 926 for the set of weights of $w_m=0.12$ and $w_p=0.88$. For example, for the set of weights of $w_m=0.12$ and $w_p=0.88$, for a false accept rate of approximately 1%, the associated false reject rate would be approximately 3%, which also shows a substantial improvements over the set of weights of $w_m=0.02$ and $w_p=0.98$.

Figure 9D:
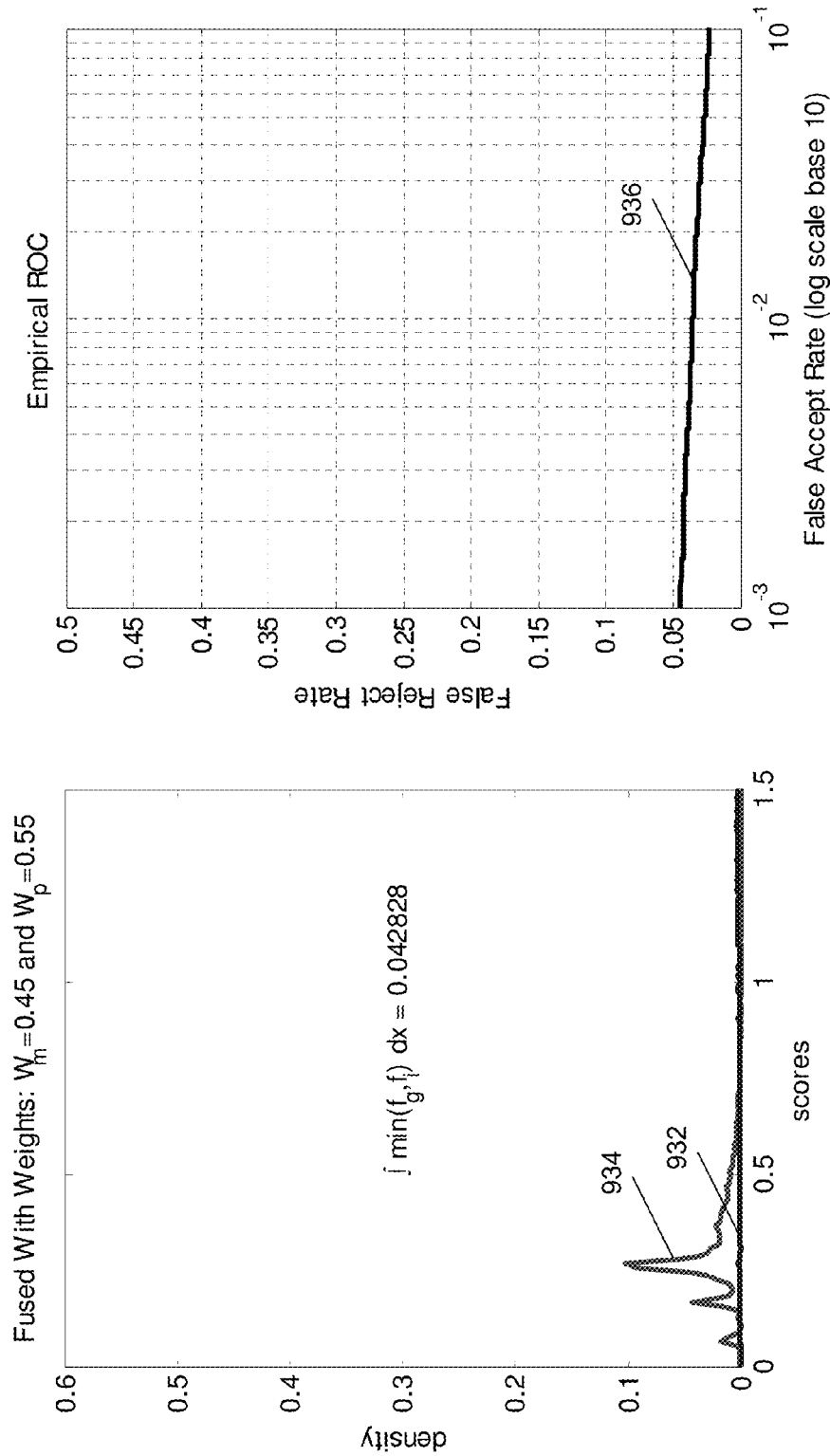
FIG. 9D illustrates an example of applying yet another set of weights to fuse minutiae matching scores and pattern matching scores.

FIG. 9D illustrates an example of applying yet another set of weights to fuse minutiae matching scores and pattern matching scores according to aspects of the present disclosure. In this example, the set of weights being used is $w_m=0.45$ and $w_p=0.55$, which represents yet another step of the fusion process of the minutiae matching scores and pattern matching scores described above. The plot on the left-hand side shows the separation between the fused scores for the genuine fingerprint images (curve 932) and the fused scores for the impostor fingerprint images (curve 934). The plot on the right-hand side shows a corresponding empirical ROC 936 for the set of weights of $w_m=0.45$ and $w_p=0.55$. For example, with the set of weights of $w_m=0.45$ and $w_p=0.55$, for a false accept rate of approximately 1%, the associated false reject rate would be approximately 4%, which also shows some deterioration over the set of weights of $w_m=0.12$ and $w_p=0.88$.

Figure 9E:
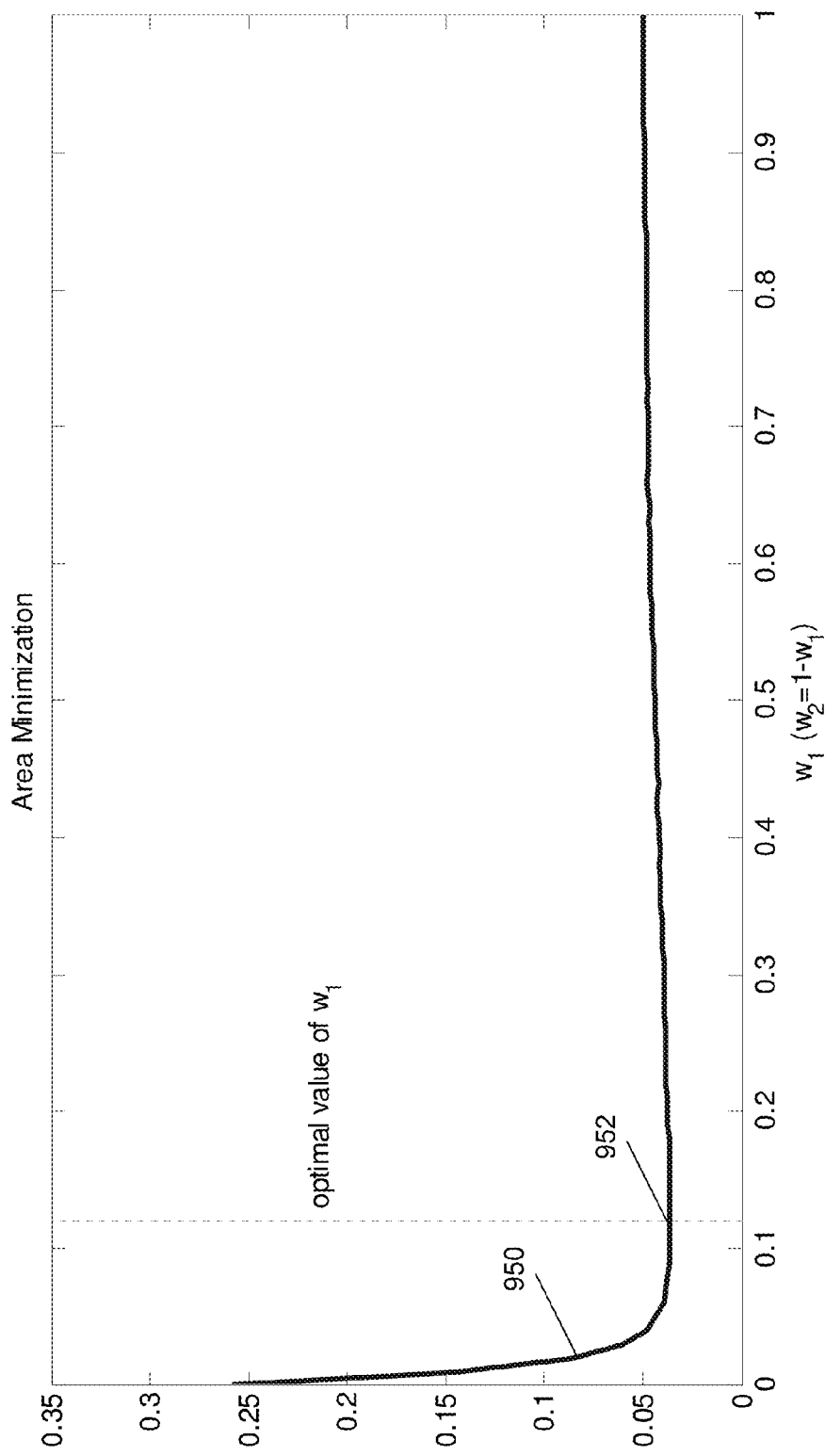
FIG. 9E illustrates a method of determining a set of weights to be applied to fuse minutiae matching scores and pattern matching scores according to aspects of the present disclosure.

FIG. 9E illustrates a method of determining a set of weights to be applied to fuse minutiae matching scores and pattern matching scores according to aspects of the present disclosure. As shown in FIG. 9E, plot 950 shows results of area minimization of the probability density curves for the genuine fingerprint images and the impostor fingerprint images with different combination of weights being applied to the minutiae matching scores and pattern matching scores ranging from 0 to 1. In this example, the minimum area can be achieved with $w_m=0.12$ and $w_p=0.88$, which is at the point labeled 952.

FIG. 10A illustrates an exemplary flow chart for implementing methods of verifying fingerprint images according to aspects of the present disclosure. In block 1002, the method receives an inquiry fingerprint image of a user. In block 1004, the method identifies pattern characteristics of the inquiry fingerprint image. In block 1006, the method identifies minutiae characteristics of the inquiry fingerprint image. In block 1008, the method determines a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints. In block 1010, the method verifies the inquiry fingerprint image based on a set of fused scores computed using the weighted combination of the pattern characteristics of the inquiry fingerprint image and the minutiae characteristics of the inquiry fingerprint image.

FIG. 10B illustrates an exemplary flow chart for implementing methods of identifying pattern characteristics of an inquiry fingerprint image according to aspects of the present disclosure. In block 1012, the method receives one or more templates of collected fingerprint images of the user from a template repository. In block 1014, the method computes a set of pattern matching scores using a pattern matching template of the inquiry fingerprint image and the one or more templates of collected fingerprint images of the user. According to aspects of the present disclosure, the methods performed in block 1014 may further or optionally include the methods performed in blocks 1016 and 1018. In block 1016, the method identifies a range of rotation angles of the inquiry fingerprint image. In block 1018, the method computes the set of pattern matching scores based on the range of rotation angles of the inquiry fingerprint image.

FIG. 10C illustrates another exemplary flow chart for implementing methods of identifying minutiae characteristics of an inquiry fingerprint image according to aspects of the present disclosure. In block 1022, the method extracts a minutiae template of the inquiry fingerprint image. In block 1024, the method receives one or more templates of collected fingerprint images corresponding to the user from a template repository. In block 1026, the method computes a set of minutiae matching scores using the minutiae template of the inquiry fingerprint image and the one or more templates of collected fingerprint images corresponding to the user.

FIG. 10D illustrates an exemplary flow chart for implementing methods of determining a weighted combination of the pattern characteristics of the inquiry fingerprint image and the minutiae characteristics of the inquiry fingerprint image according to aspects of the present disclosure. In block 1032, the method generates the first empirical probability density function of genuine fingerprints. In block 1034, the method generates the second empirical probability density function of impostor fingerprints. In block 1036, the method identifies a maximum separation of the first empirical probability density function of genuine fingerprints from the second empirical probability density function of impostor fingerprints. According to aspects of the present disclosure, the method of determining a weighted combination of the pattern characteristics of the inquiry fingerprint image and the minutiae characteristics of the inquiry fingerprint image may further or optionally include the methods performed in blocks 1038 and 1040. In block 1038, the method determines the pattern matching weight and the minutiae matching weight corresponding to the maximum separation of the first empirical probability density function of genuine fingerprints from the second empirical probability density function of impostor fingerprints. In block 1040, the method updates the minutiae matching weight and/or the pattern matching weight dynamically and/or periodically based on usage data collected overtime.

Note that at least the following three paragraphs, FIG. 2, FIG. 7, FIG. 10A-10D and their corresponding descriptions provide means for receiving an inquiry fingerprint image of a user; means for identifying pattern characteristics of the inquiry fingerprint image; means for identifying minutiae characteristics of the inquiry fingerprint image; means for determining a weighted combination of the pattern characteristics of the inquiry fingerprint image and the minutiae characteristics of the inquiry fingerprint image, where the weighted combination comprises a pattern matching weight and a minutiae matching weight derived in accordance with a separation of a first empirical probability density function of genuine fingerprints from a second empirical probability density function of impostor fingerprints; and means for verifying the inquiry fingerprint image based on a set of fused scores computed using the weighted combination of the pattern characteristics of the inquiry fingerprint image and the minutiae characteristics of the inquiry fingerprint image. The paragraphs herein, FIG. 2, FIG. 7, FIG. 10A-10D and their corresponding descriptions provide means for receiving one or more templates of collected fingerprint images of the user from a template repository; means for computing a set of pattern matching scores using a pattern matching template of the inquiry fingerprint image and the one or more templates of collected fingerprint images of the user; means for identifying a range of rotation angles of the inquiry fingerprint image; means for computing the set of pattern matching scores based on the range of rotation angles of the inquiry fingerprint image; means for extracting a minutiae template of the inquiry fingerprint image; means for receiving one or more templates of collected fingerprint images of the user from a template repository; means for computing a set of minutiae matching scores using the minutiae template of the inquiry fingerprint image and the one or more templates of collected fingerprint images of the user; means for generating the first empirical probability density function of genuine fingerprints; means for generating the second empirical probability density function of impostor fingerprints; means for identifying a maximum separation of the first empirical probability density function of genuine fingerprints from the second empirical probability density function of impostor fingerprints; and means for determining the pattern matching weight and the minutiae matching weight corresponding to the maximum separation of the first empirical probability density function of genuine fingerprints from the second empirical probability density function of impostor fingerprints.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and or as used herein may include a variety of meanings that will depend at least in part upon the context in which it is used. Typically, or if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of verifying fingerprint images, comprising:
   receiving an inquiry fingerprint image of a user;
   identifying pattern characteristics of the inquiry fingerprint image;
   identifying minutiae characteristics of the inquiry fingerprint image;
   determining a weighted combination of the pattern characteristics of the inquiry fingerprint image and the minutiae characteristics of the inquiry fingerprint image, wherein the weighted combination comprises a pattern matching weight and a minutiae matching weight derived in accordance with a separation of a first empirical probability density function of genuine fingerprints from a second empirical probability density function of impostor fingerprints, further comprising updating at least one of the minutiae matching weight and the pattern matching weight dynamically based on usage data collected; and
   verifying the inquiry fingerprint image based on a set of fused scores computed using the weighted combination of the pattern characteristics of the inquiry fingerprint image and the minutiae characteristics of the inquiry fingerprint image.

2. The method of claim 1, wherein the identifying the pattern characteristics of the inquiry fingerprint image comprises:
   receiving one or more templates of collected fingerprint images of the user from a template repository; and
   computing a set of pattern matching scores using a pattern matching template of the inquiry fingerprint image and the one or more templates of collected fingerprint images of the user.

3. The method of claim 2, wherein computing the set of pattern matching scores comprises:
   identifying a range of rotation angles of the inquiry fingerprint image; and
   computing the set of pattern matching scores based on the range of rotation angles of the inquiry fingerprint image.

4. The method of claim 1, wherein the identifying the minutiae characteristics of the inquiry fingerprint image comprises:
   extracting a minutiae template of the inquiry fingerprint image;
   receiving one or more templates of collected fingerprint images of the user from a template repository; and
   computing a set of minutiae matching scores using the minutiae template of the inquiry fingerprint image and the one or more templates of collected fingerprint images of the user.

5. The method of claim 1, wherein determining a weighted combination of the pattern characteristics of the inquiry fingerprint image and the minutiae characteristics of the inquiry fingerprint image comprises:
   generating the first empirical probability density function of genuine fingerprints;
   generating the second empirical probability density function of impostor fingerprints; and
   identifying a maximum separation of the first empirical probability density function of genuine fingerprints from the second empirical probability density function of impostor fingerprints.

6. The method of claim 5, wherein determining a weighted combination of the pattern characteristics of the inquiry fingerprint image and the minutiae characteristics of the inquiry fingerprint image further comprises:
   determining the pattern matching weight and the minutiae matching weight corresponding to the maximum separation of the first empirical probability density function of genuine fingerprints from the second empirical probability density function of impostor fingerprints.

7. The method of claim 1, wherein verifying the inquiry fingerprint image comprises:
   computing the set of fused scores based on a sum of a first product of the minutiae matching weight and a set of minutiae matching scores and a second product of the pattern matching weight and a set of pattern matching scores; and determining validity of the inquiry fingerprint image using the set of fused scores.

8. A mobile device configured to verify fingerprint images, comprising:

one or more sensors configured to receive an inquiry fingerprint image of a user;

one or more processors that include a control logic, wherein the control logic includes logic configured to identify pattern characteristics of the inquiry fingerprint image;

logic configured to identify minutiae characteristics of the inquiry fingerprint image;

logic configured to determine a weighted combination of the pattern characteristics of the inquiry fingerprint image and the minutiae characteristics of the inquiry fingerprint image, wherein the weighted combination comprises a pattern matching weight and a minutiae matching weight derived in accordance with a separation of a first empirical probability density function of genuine fingerprints from a second empirical probability density function of impostor fingerprints, further comprising logic configured to update at least one of the minutiae matching weight and the pattern matching weight dynamically based on usage data collected; and logic configured to verify the inquiry fingerprint image based on a set of fused scores computed using the weighted combination of the pattern characteristics of the inquiry fingerprint image and the minutiae characteristics of the inquiry fingerprint image.

9. The mobile device of claim 8, wherein the logic configured to identify the pattern characteristics of the inquiry fingerprint image comprises:

logic configured to receive one or more templates of collected fingerprint images of the user from a template repository: and logic configured to compute a set of pattern matching scores using a pattern matching template of the inquiry fingerprint image and the one or more templates of collected fingerprint images of the user.

10. The mobile device of claim 9, wherein logic configured to compute the set of pattern matching scores comprises:

logic configured to identify a range of rotation angles of the inquiry fingerprint image; and logic configured to compute the set of pattern matching scores based on the range of rotation angles of the inquiry fingerprint image.

11. The mobile device of claim 8, wherein the logic configured to identify the minutiae characteristics of the inquiry fingerprint image comprises:

logic configured to extract a minutiae template of the inquiry fingerprint image;

logic configured to receive one or more templates of collected fingerprint images of the user from a template repository; and logic configured to compute a set of minutiae matching scores using the minutiae template of the inquiry fingerprint image and the one or more templates of collected fingerprint images of the user.

12. The mobile device of claim 8, wherein the logic configured to determine a weighted combination of the pattern characteristics of the inquiry fingerprint image and the minutiae characteristics of the inquiry fingerprint image comprises:

logic configured to generate the first empirical probability density function of genuine fingerprints;

logic configured to generate the second empirical probability density function of impostor fingerprints; and logic configured to identify a maximum separation of the first empirical probability density function of genuine fingerprints from the second empirical probability density function of impostor fingerprints.

13. The mobile device of claim 12, wherein the logic configured to determine a weighted combination of the pattern characteristics of the inquiry fingerprint image and the minutiae characteristics of the inquiry fingerprint image further comprises:

logic configured to determine the pattern matching weight and the minutiae matching weight corresponding to the maximum separation of the first empirical probability density function of genuine fingerprints from the second empirical probability density function of impostor fingerprints.

14. The mobile device of claim 8, wherein the logic configured to verify the inquiry fingerprint image comprises:

logic configured to compute the set of fused scores based on a sum of a first product of the minutiae matching weight and a set of minutiae matching scores and a second product of the pattern matching weight and a set of pattern matching scores: and logic configured to determine validity of the inquiry fingerprint image using the set of fused scores.

15. A non-transitory computer-readable storage medium including instructions stored thereon that, when executed, cause a mobile device to verify fingerprint images, comprising:

instruction configured to receive an inquiry fingerprint image of a user;

instruction configured to identify pattern characteristics of the inquiry fingerprint image;

instruction configured to identify minutiae characteristics of the inquiry fingerprint image;

instruction configured to determine a weighted combination of the pattern characteristics of the inquiry fingerprint image and the minutiae characteristics of the inquiry fingerprint image, wherein the weighted combination comprises a pattern matching weight and a minutiae matching weight derived in accordance with a separation of a first empirical probability density function of genuine fingerprints from a second empirical probability density function of impostor fingerprints, further comprising instruction configured to update at least one of the minutiae matching weight and the pattern matching weight dynamically based on usage data collected; and instruction configured to verify the inquiry fingerprint image based on a set of fused scores computed using the weighted combination of the pattern characteristics of the inquiry fingerprint image and the minutiae characteristics of the inquiry fingerprint image.

16. The non-transitory computer-readable storage medium of claim 15, wherein the instruction configured to identify the pattern characteristics of the inquiry fingerprint image comprises:

instruction configured to receive one, or more templates of collected fingerprint images of the user from a template repository; and instruction configured to compute a set of pattern matching scores using a pattern matching template of the inquiry fingerprint image and the one or more templates of collected fingerprint images of the user.

17. The non-transitory computer-readable storage medium of claim 16, wherein instruction configured to compute the set of pattern matching scores comprises:
 instruction configured to identify a range of rotation angles of the inquiry fingerprint image; and
 instruction configured to compute the set of pattern matching scores based on the range of rotation angles of the inquiry fingerprint image.

18. The non-transitory computer-readable storage medium of claim 15, wherein the instruction configured to identify the minutiae characteristics of the inquiry fingerprint image comprises:
 instruction configured to extract a minutiae template of the inquiry fingerprint image;
 instruction configured to receive one or more templates of collected fingerprint images of the user from a template repository; and
 instruction configured to compute a set of minutiae matching scores using the minutiae template of the inquiry fingerprint image and the one or more templates of collected fingerprint images of the user.

19. The non-transitory computer-readable storage medium of claim 15, wherein the instruction configured to determine a weighted combination of the pattern characteristics of the inquiry fingerprint image and the minutiae characteristics of the inquiry fingerprint image comprises:
 instruction configured to generate the first empirical probability density function of genuine fingerprints;
 instruction configured to generate the second empirical probability density function of impostor fingerprints; and
 instruction configured to identify a maximum separation of the first empirical probability density function of genuine fingerprints from the second empirical probability density function of impostor fingerprints.

20. The non-transitory computer-readable storage medium of claim 19, wherein the instruction configured to determine a weighted combination of the pattern characteristics of the inquiry fingerprint image and the minutiae characteristics of the inquiry fingerprint image further comprises:
 instruction configured to determine the pattern matching weight and the minutiae matching weight corresponding to the maximum separation of the first empirical probability density function of genuine fingerprints from the second empirical probability density function of impostor fingerprints.

21. The non-transitory computer-readable storage medium of claim 15, wherein the instruction configured to verify the inquiry fingerprint image comprises:
 instruction configured to compute the set of fused scores based on a sum of a first product of the minutiae matching weight and a set of minutiae matching scores and a second product of the pattern matching weight and a set of pattern matching scores; and
 instruction configured to determine validity of the inquiry fingerprint image using the set of fused scores.

22. An apparatus for verifying fingerprint images, comprising:
 means for receiving an inquiry fingerprint image of a user;
 means for identifying pattern characteristics of the inquiry fingerprint image;
 means for identifying minutiae characteristics of the inquiry fingerprint image;
 means for determining a weighted combination of the pattern characteristics of the inquiry fingerprint image and the minutiae characteristics of the inquiry fingerprint image, wherein the weighted combination comprises a pattern matching weight and a minutiae matching weight derived in accordance with a separation of a first empirical probability density function of genuine fingerprints from a second empirical probability density function of impostor fingerprints, further comprising means for updating at least one of the minutiae matching weight and the pattern matching weight dynamically based on usage data collected; and
 means for verifying the inquiry fingerprint image based on a set of fused scores computed using the weighted combination of the pattern characteristics of the inquiry fingerprint image and the minutiae characteristics of the inquiry fingerprint image.

23. The apparatus of claim 22, wherein the means for identifying the pattern characteristics of the inquiry fingerprint image comprises:
 means for receiving one or more templates of collected fingerprint images of the user from a template repository; and
 means for computing a set of pattern matching scores using a pattern matching template of the inquiry fingerprint image and the one or more templates of collected fingerprint images of the user.

24. The apparatus of claim 23, wherein the means for computing the set of pattern matching scores comprises:
 means for identifying a range of rotation angles of the inquiry fingerprint image; and
 means for computing the set of pattern matching scores based on the range of rotation angles of the inquiry fingerprint image.

25. The apparatus of claim 22, wherein the means for identifying the minutiae characteristics of the inquiry fingerprint image comprises:
 means for extracting a minutiae template of the inquiry fingerprint image;
 means for receiving one or more templates of collected fingerprint images of the user from a template repository; and
 means for computing a set of minutiae matching scores using the minutiae template of the inquiry fingerprint image and the one or more templates of collected fingerprint images of the user.

26. The apparatus of claim 22, wherein the means for determining a weighted combination of the pattern characteristics of the inquiry fingerprint image and the minutiae characteristics of the inquiry fingerprint image comprises:
 means far generating the first empirical probability density function of genuine fingerprints;
 means for generating the second empirical probability density function of impostor fingerprints; and
 means for identifying a maximum separation of the first empirical probability density function of genuine fingerprints from the second empirical probability density function of impostor fingerprints.

27. The mobile device of claim 26, wherein the means for determining, a weighted combination of the pattern characteristics of the inquiry fingerprint image and the minutiae characteristics of the inquiry fingerprint image further comprises:
 means for determining the pattern matching weight and the minutiae matching weight corresponding to the maximum separation of the first empirical probability density function of genuine fingerprints from the second empirical probability density function of impostor fingerprints.

* * * * *